United States Patent
Zhao et al.

(10) Patent No.: US 8,064,102 B1
(45) Date of Patent: Nov. 22, 2011

(54) EMBEDDING FREQUENCY MODULATION INFRARED WATERMARK IN DIGITAL DOCUMENT

(75) Inventors: Yonghui Zhao, Penfield, NY (US); Zhigang Fan, Webster, NY (US); Martin E. Hoover, Rochester, NY (US); Danield A. Robbins, Williamson, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/828,744

(22) Filed: Jul. 1, 2010

(51) Int. Cl.
- H04N 1/44 (2006.01)
- H04N 1/50 (2006.01)
- H04N 1/60 (2006.01)
- G06K 9/60 (2006.01)
- G06K 15/02 (2006.01)
- G06K 19/06 (2006.01)
- B41M 3/10 (2006.01)
- B41M 3/14 (2006.01)
- B42D 15/00 (2006.01)
- G07D 7/12 (2006.01)

(52) U.S. Cl. ........ 358/1.9; 358/3.28; 358/509; 358/518; 382/100; 382/191; 283/85; 283/113; 283/902; 235/468

(58) Field of Classification Search .......... 358/1.9, 358/3.28, 509, 518; 382/100, 135, 162, 167, 382/190, 191, 280; 235/468, 491; 283/85, 283/88, 92, 113, 902; 340/5.86; 356/51; 347/107; 399/366
See application file for complete search history.

(56) References Cited

U.S. PATENT DOCUMENTS

| | | | | |
|---|---|---|---|---|
| 4,869,532 | A * | 9/1989 | Abe et al. | 283/88 |
| 6,957,024 | B2 * | 10/2005 | Shinkawa et al. | 399/49 |
| 2008/0302263 | A1 | 12/2008 | Eschbach et al. | |
| 2008/0304696 | A1 | 12/2008 | Eschbach et al. | |
| 2008/0305444 | A1 | 12/2008 | Eschbach et al. | |
| 2009/0262400 | A1 | 10/2009 | Eschbach et al. | |
| 2010/0142003 | A1 * | 6/2010 | Braun et al. | 358/3.28 |

FOREIGN PATENT DOCUMENTS

GB 1534403 A * 12/1978

OTHER PUBLICATIONS

I.J. Cox, J. Kilian, F.T. Leighton and T. Shamoon, "Secure Spread spectrum Watermarking for Multimedia", IEEE Transaction on Image Processing, 6 (12), pp. 1673-1687 (1997).

* cited by examiner

*Primary Examiner* — Scott A Rogers
(74) *Attorney, Agent, or Firm* — Fay Sharpe LLP

(57) ABSTRACT

Embodiments are disclosed for generating an infrared mark indicator comprised of security information in a printed image. Image data is rendered to a CMYK image. A black plane of the CMYK image is separated and transformed to a frequency domain wherein the frequency components are alternated to encode the watermarking message. The CMY values are selected based on the encoded black value in order to maintain a same color appearance image for the printed image under a normal visual light illuminant. The image data is printed on the substrate in accordance with the transformed planes wherein upon the resultant printed image being exposed to infrared illuminant, a print pattern is detectable as an infrared mark when scanned with an infrared sensing device.

12 Claims, 3 Drawing Sheets

EMBEDDING FREQUENCY MODULATION INFRARED WATERMARK IN DIGITAL DOCUMENT

CROSS REFERENCE TO RELATED PATENTS AND APPLICATIONS

Cross-reference is made to the following applications which are incorporated by reference herein: Eschbach et al., U.S. Patent Application Publication No. US-2009-0262400-A1, published Oct. 22, 2009, entitled "INFRARED WATERMARKING OF PHOTOGRAPHIC IMAGES BY MATCHED DIFFERENTIAL BLACK STRATEGIES"; Eschbach et al., U.S. Patent Application Publication No. US-2008-0302263-A1, published Dec. 11, 2008, entitled "INFRARED ENCODING OF SECURITY ELEMENTS USING STANDARD XEROGRAPHIC MATERIALS"; Eschbach et al., U.S. Patent Application Publication No. US-2008-0305444-A1, published Dec. 11, 2008, entitled "INFRARED ENCODING OF SECURITY ELEMENTS USING STANDARD XEROGRAPHIC MATERIALS WITH DISTRACTION PATTERNS"; Eschbach et al., U.S. Patent Application Publication No. US-2008-0304696-A1, published Dec. 11, 2008, entitled "INFRARED ENCODING FOR EMBEDDING MULTIPLE VARIABLE DATA INFORMATION COLLOCATED IN PRINTED DOCUMENTS".

TECHNICAL FIELD

The present invention in various embodiments relates generally to the useful manipulation of infrared components found in toners as commonly utilized in various printer and electrostatographic print environments. More particularly, the teachings provided herein relate to at least one realization of infrared encoding of data elements or infrared marks.

BACKGROUND

Since print systems have been in existence, printers have sought methods for inhibiting counterfeiting and unauthorized copying of printed documents. Enhanced complexity in an engraved pattern of a press plate is one such method that most people are familiar with as a result of its everyday observation in currency bills. Bank checks, security documents, bonds and other financial documents are other examples of printed documents having complex background patterns to inhibit unauthorized reproduction. Identification documents, e.g. passports, social security cards and the like, are other examples. Credit cards not only have complex background patterns, but now also have embedded holographics to enhance verification and authentication of such a card.

It is desirable to have a way to provide for the detection of counterfeiting, illegal alteration, and/or copying of a document, most desirably in a manner that will provide document security and which is also applicable for digitally generated documents. It is desirable that such a solution also have minimum impact on system overhead requirements as well as minimal storage requirements in a digital processing and printing environment. Additionally, it is particularly desirable that this solution be obtained without physical modification to the printing device and without the need for costly special materials and media.

Watermarking is a common way to ensure security in digital documents. Many watermarking approaches exist with different trade-offs in cost, fragility, robustness, etc. One prior art approach is to use special ink rendering where the inks are invisible under standard illumination. These inks normally respond to light outside the visible range and thereby may be made visible. Examples of such extra-spectral techniques are UV (ultra-violet) and IR (infrared). This traditional approach is to render the encoded data with special inks that are not visible under normal light, but have strong distinguishing characteristics under the special spectral illumination. Determination of the presence or absence of such encoding may be thereby subsequently performed using an appropriate light source and detector. One example of this approach is found in U.S. Patent Application Publication No. US-2007-0017990 to Katsurabayashi et al., which is herein incorporated by reference in its entirety for its teachings. However, these special inks and materials are often difficult to incorporate into standard electro-photographic or other non-impact printing systems like solid ink printers, either due to cost, availability or physical/chemical properties. This in turn discourages their use in variable data printing arrangements, such as for redeemable coupons or other personalized printed media for example.

Another approach is digital watermarking, as for example U.S. Pat. No. 5,734,752 to Knox, where there is provided a method for generating data encoding in the form of a watermark in a digitally reproducible document which is substantially invisible when viewed including the steps of: (1) producing a first stochastic screen pattern suitable for reproducing a gray image on a document; (2) deriving at least one stochastic screen description that is related to said first pattern; (3) producing a document containing the first stochastic screen; (4) producing a second document containing one or more of the stochastic screens in combination, whereby upon placing the first and second document in superposition relationship to allow viewing of both documents together, correlation between the first stochastic pattern on each document occurs everywhere within the documents where the first screen is used, and correlation does not occur where the area where the derived stochastic screens occur and the image placed therein using the derived stochastic screens becomes visible.

U.S. Patent Application Publication No. US-2008-0302263-A1 discloses a system for creating an infrared mark employing the different infrared transmission characteristics of standard non-impact printing materials, specifically the different infrared transmission characteristics of the four (CMYK) or more printing colorants, whereby the application of such infrared transparent colorants on a substrate results in a high level of infrared reflectance of the combination due to the substrate reflectance characteristics. The infrared mark is created by printing the first colorant combination with a relatively high infrared reflectance in direct spatial proximity to a second colorant combination having the essentially same visual response under visible light, while having a different infrared reflectance by changing the relative amounts of the colorants in the mixture in a manner that is essentially invisible to the human eye under normal illumination.

The underlying principal is that carbon-base black toner is a good absorber of infrared light, while the other toners (e.g., cyan, magenta and yellow) are almost transparent in the infrared region. This infrared watermark and distracting background are rendered with two different GCR (Gray Component Replacement) strategies that either maximize or minimize the usage of black toner. This system is limited in that the watermark critically depends on the accurate printer characterization and might be perceptible due to the poor printer characterization or the printer drift from time-to-time. In other words, the high IR absorption component (K) color of the mark may not match the low absorption component (CMV) color under normal light conditions so that the document is not acceptable for practical or commercial use.

Watermarking in frequency domain is also known and usually involves alternating frequency components according to watermarking messages. Such techniques result in a watermark that is dispersed throughout the image. However, all such known methods are based on visible lights and so can be human perceptible as well as machine.

More particularly, there is a need for a system which is based on IR detectable security information that has advantages over conventional frequency domain watermarking in two main aspects: (1) it easily enables "blind decoding", more specifically, the original image is not necessarily required in the decoding process and as a result, the method can be used more broadly in many applications, and (2) the method is less noisy. In conventional methods, the watermark noise is one of the limiting factors in design consideration. The desired method would conceptually reach zero (visual) noise.

There is thus a need for a system which better hides an infrared watermark within a printed document without being subject to system temporal change.

SUMMARY

The subject embodiments comprise embedding watermark security information through frequency modulation of the black plane of a CMYK image, and then decoding the machine-readable watermark with an infrared scanner. The black plane is first transformed to frequency domain with Discrete Cosine Transform (DCT), Discrete Fourier Transform (DFT), or Discrete Wavelet Transform (DWT), and then embedded with the watermark using a method such as the Cox method (cited below). The CMY values are tailored accordingly based on the encoded black value in order to maintain the same color appearance as the original image. The watermark hidden in a printed image can be retrieved by scanning with an infrared scanner. The scanned image, which contains mainly the encoded black channel information is transformed to frequency domain for decoding the watermark. Such a process provides the advantage in that in the subject embodiment the watermark is only machine-readable, hard to be noticed and insensitive to printer variation from time-to-time.

In accordance with the present embodiments, a method is disclosed for generating an infrared mark indicator. Selected image data is rendered to a CMYK image. A black plane of the CMYK image is separated and transformed to a frequency domain and a selected set of frequency components are altered according to the watermarking message. The CMY values are adjusted to minimize the visual changes due to the black alternation. The image data is printed on the substrate in accordance with the transformed black plane wherein upon the resultant printed image being exposed to infrared illuminant, a print pattern is detectable as an infrared mark when scanned with an infrared sensing device.

The advantages of the subject embodiments comprise a watermark that is only machine-readable, hard to be noticed and insensitive to printer variations over time, such as color drift.

DETAILED DESCRIPTION

Figure 1:
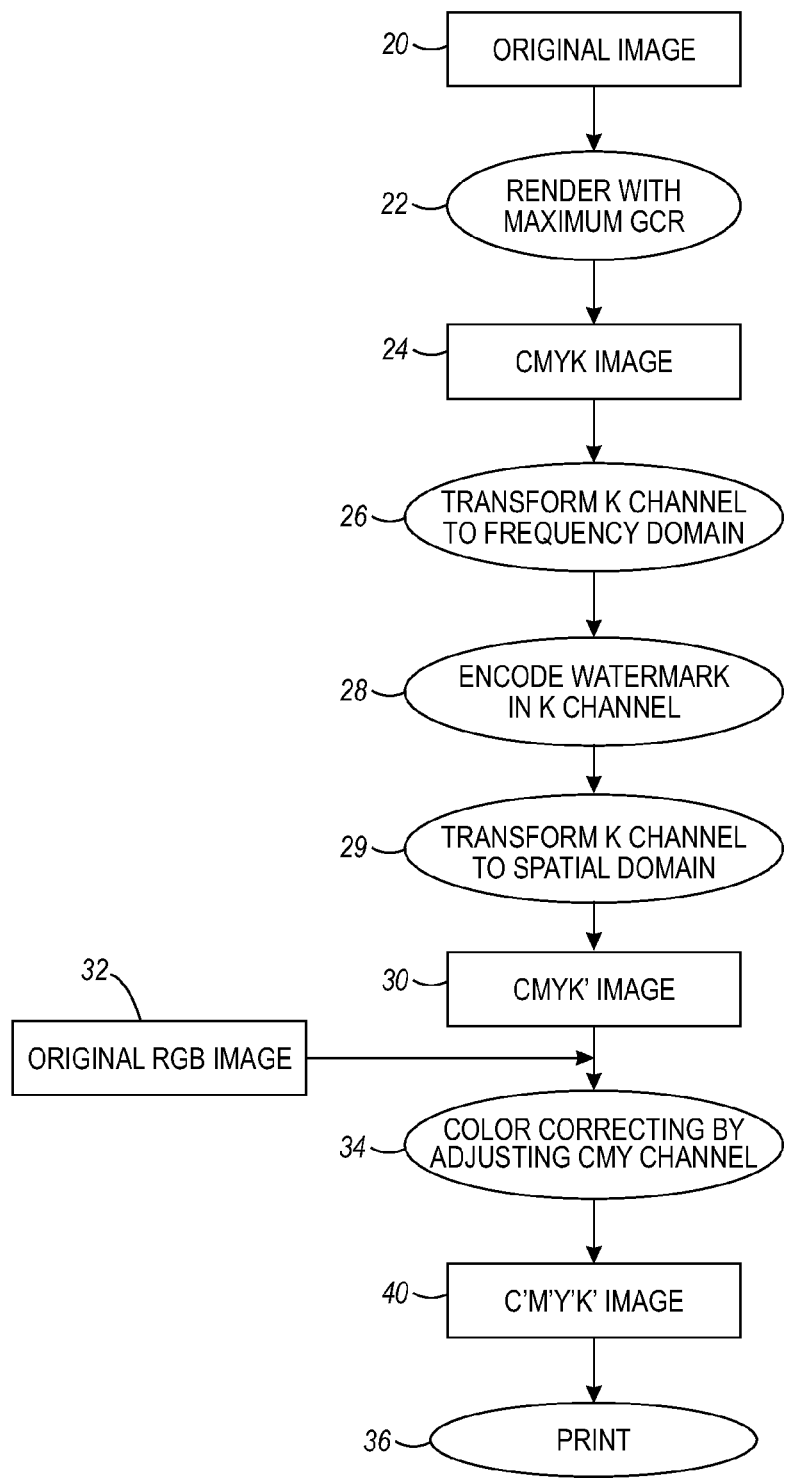
FIG. 1 comprises a flowchart for watermark embedding.

For a general understanding of the present disclosure, reference is made to the drawings. In the drawings, like reference numerals have been used throughout to designate identical elements. In describing the present disclosure, the following term(s) have been used in the description.

The term "data" refers herein to physical signals that indicate or include information. An "image", as a pattern of physical light or a collection of data representing said physical light, may include characters, words, and text as well as other features such as graphics. A "digital image" is by extension an image represented by a collection of digital data. In the event that one term or the other is deemed to be narrower or broader than the other, the teaching as provided herein and claimed below is directed to the more broadly determined definitional term, unless that term is otherwise specifically limited within the claim itself.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. It can be measured as a color difference or as a luminance difference or both. A digital color printing system is an apparatus arrangement suited to accepting image data and rendering that image data upon a substrate.

For the purposes of clarity for what follows, the following term definitions are herein provided:

Colorant: one of the fundamental subtractive C, M, Y, K, primaries, (cyan, magenta, yellow, and black)—which may be realized in formulation as, liquid ink, solid ink, dye, or electrostatographic toner.

Colorant mixture: a particular combination of C, M, Y, K colorants.

Infrared mark: a watermark embedded in the image that has the property of being relatively indecipherable under normal light, and yet decipherable under IR (Infra-Red) illumination by appropriate IR sensing devices, such as IR cameras.

Metameric rendering/printing: the ability to use multiple colorant combinations to render a single visual color, as can be achieved when printing with more than three colorants.

Frequency domain based watermarking: watermarking in frequency domain involves alternating frequency components according to the watermarking messages.

In the subject embodiments, the altering comprises implementing different CMYK color combinations to maintain a same color appearance under visible lighting but different infrared reflectance under infrared lighting.

There is well established understanding in the printing industry regarding the utilization of infrared material inks in combination with infrared light sources as employed for security marks, particularly as a technique to deter counterfeiting or unauthorized copying. However, there remains a long standing need for an approach to such a technique which will provide the same benefit but with lower complexity and cost, particularly in a digital printing environment, using only common consumables as well and have robust operating benefits without being subject to temporal drifting printer characterization.

The subject teachings and embodiments describe a system and method that embeds the security information through frequency modulation of the black plane of a CMYK image, and then decodes only the machine-readable watermark with an infrared scanner. The black plane is first transformed to frequency domain with a Discrete Cosine Transform (DCT), Discrete Fourier Transform (DFT), or a Discrete Wavelet Transform (DWT), and then embedded as a watermark using various methods (e.g., Cox method). The CMY values are tailored accordingly based on the encoded black value in order to maintain the same color appearance as the original image. The watermark hidden in the printed image can be retrieved by scanning with an infrared scanner. The scanned image, which contains mainly the encoded black channel information, is transformed to frequency domain for decoding the watermark. The obvious advantage of this technique is that the watermark is hard to be noticed and insensitive to the printer variation from time-to-time and easily implantable for blind decoding.

Figures 3, 4:
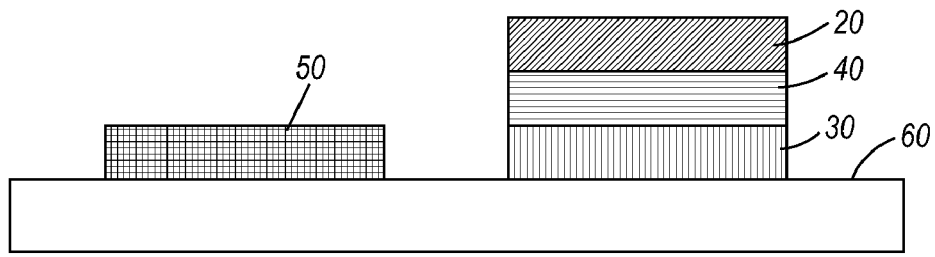
FIG. 3 schematically depicts in cross-sectional profile two instances where a single visual color black is color-matched with different color combinations under visible lighting, but exhibits different infrared reflections under infrared lighting.
FIG. 4 illustrates selected unused coefficients in two-level coding for a 10×10 image.

More particularly, FIG. 3 in cross-section conceptually shows different ways in which the visual color black can be achieved either by using a black colorant 10, or an alternative by the superposition of yellow 12, magenta 14 and cyan 16, colorants as printed onto the substrate print surface 18. The important aspect depicted by FIG. 3 is that a single color, in this case black, can be achieved by a multitude of metameric color combinations, which combinations will have different and detectable infrared reflectances.

With reference to FIG. 1, the color space of an input image can be any color spaces, such as sRGB, adobe RGB or Gracol CMYK. The input image data can render to a CMYK image for a particular printer device (not shown) through a standard image path connecting the source and destination profiles. In the present embodiments, the original image 20 is rendered with a destination profile with maximum GCR to maximize the usage of black toner. The K channel of the CMYK image data 24 is then transformed 26 to a frequency domain and security information, such as a watermark, is encoded 28 in the K channel. The encoding comprises transforming 29 the K channel to spatial domain, selecting certain frequencies of the K channel and altering them according to the watermarking messages. The result of the encoding is that infrared reflectance of the image will provide a machine-readable mark. The encoded CMYK' image 30 is then compared with an original RGB image 32 for color correction 34 by adjusting the CMY channels to obtain desired matching of colors and avoid detectable color incongruities. The resulting C'M'Y'K' image 36 is then printed 40.

As noted above, the black plane of the CMYK image is separated and transformed to frequency domain in any number of known frequency domain transformation methods. Such methods can comprise Discrete Cosine Transform (DCT), Discrete Fourier Transform (DFT), or Discrete Wavelet Transform (DWT). Embedding the watermark can also be implemented using various methods including a Cox method (I. J. Cox, J. Kilian, F. T. Leighton and T. Shamoon, "*Secure Spread Spectrum Watermarking for Multimedia*", IEEE Transaction on Imaging Processing, 6(12): 1673-1687 (1997), which is herein incorporated by reference in its entirety), or a two-level coding method which will be discussed in more detail below.

The Cox method is a known method to embed the watermark in frequency domain. The black plane is transformed to frequency domain. The watermark is placed into the n largest magnitude coefficients excluding the DC component using Equation (1) where $C_i$ is the original coefficient, $C'_i$ is the watermarked coefficient, $X_i$ is the security watermark code, and $\alpha$ is a scaling parameter which determines the extent to which $X_i$ alters $C_i$. After that, the image is transformed back to spatial domain using the same frequency-domain transformation.

$$C'_i = C_i(1+\alpha X_i) \ i=1, 2, \ldots, n \quad (1)$$

An alternative two-level coding technique can be used for embedding the watermark. This method is superior to the Cox method in one aspect in that the original image is not required in the decoding process. The method also includes selecting m largest magnitude coefficients that are greater than a pre-determined threshold excluding the six coefficients as indicated in FIG. 4. These six coefficients are perceptually significant components and should not be altered; otherwise, the resulting image will be severely degraded. The watermark is represented with series of binary numbers. The selected frequency components are then processed in a pre-determined order, for example, zigzag order that is well known in DCT coding. The i-th selected frequency component is applied to code the i-th bit of the watermarking message. If the number is zero, the magnitude coefficient is set to a fixed lower value, while if the number is one, the magnitude coefficient is set to a fixed higher value. In this case, the threshold value is set to 1000, the lower and higher values are 700 and 1200, respectively.

After the watermark is embedded in the black channel, the color correction step involves modifying the CMY channels so that the original image and the watermarked image have the same visual appearance. One possible approach is to build a color transformation from RGBK to CMY. The original image provides the first three components and the watermarked black channel is the fourth component. The modified CMY image can be derived from this color transformation. Finally, the final watermarked digital image comprises combining the C'M'Y'K' modified image 36 with the watermarked black channel and printed 40.

Figure 2:
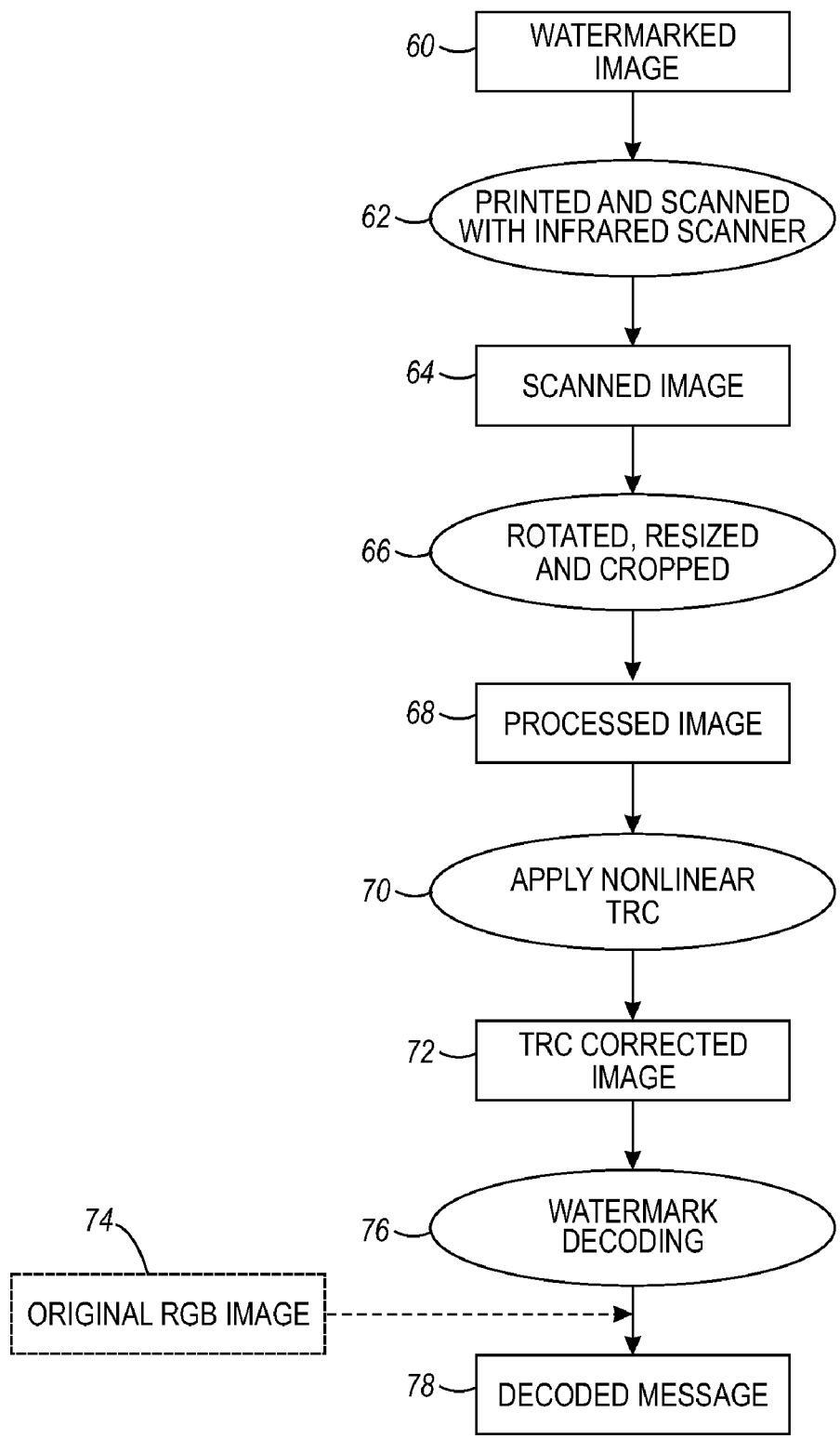
FIG. 2 comprises a flowchart for watermark decoding.

With particular reference to FIG. 2, the process for decoding the watermark image 60 is illustrated. The printed image is scanned 62 with an infrared scanner and the scanned image 64 is processed including rotating, resizing and cropping 66. As noted above, a basic premise of the subject embodiments is that carbon-based black toner is a good absorber of infrared light, while other toners (e.g., cyan, magenta and yellow) are almost transparent in the infrared region, so the infrared scanned image 64 represents merely the black channel information of a CMYK image. A nonlinear tone reproduction curve (TRC) is supplied 70 to the process image. The image of interest is cropped from the scanned image by removing the blank boundary. The image of interest might be skewed during the scanning process, so a rotating operation is necessary. The image is also resized to the same size as the original image. The relationship between the black amount and its IR response is not linear and indicated by a nonlinear tone reproduction curve. So the black amount is estimated from IR response of the scanned image by applying the inverse of the nonlinear curve. After that, the black channel information is used to decode the watermarking message.

After the nonlinear correction, the corrected image 72 is transformed to frequency domain using DCT and the security code is extracted based on different methods to acquire the decoded message 78. When using the Cox method for the security code extraction, the original CMYK (or original RGB image) image 74 is required in the decoding step. Both the original image and the corrected scanned image are transformed to the frequency domain. The n largest magnitude coefficients of the original image $C_i$ are recorded along with their positions, and the coefficients of the scanned image $C'_i$ at these positions are extracted. The decoded messages are expressed as Equation (2) which can be obtained from Equation (1)

$$X_i = \frac{1}{\alpha}\left(\frac{C'_i}{C_i} - 1\right) \quad i = 1, 2, \ldots, n \qquad (2)$$

Then the decoded message is compared with the original message. The correlation coefficient will be used to determine the similarity between the original and decoded message. During the whole process, the original image is watermarked, halftoned, printed, scanned, and geometric altered (rotated, scaled and cropped), and there is also the variation of infrared signals at a certain black level caused by CMV amounts. So the robustness of detection is limited. If the correlation coefficient is higher than 65%, it proves the originality of this image or the existence of the watermark.

When two-level coding is used for the extraction of the security code, the original CMYK image is not required in the decoding step, which is also called blind decoding. The m largest magnitude coefficients of the scanned image are extracted and processed in the same order for encoding. The i-th extracted frequency is used to reconstruct the i-th bit of the watermarking message. If the magnitude coefficient is greater than a differential threshold, the secret code is 1; otherwise, the code is 0. For example, the encoded lower and higher values are 700 and 1200, respectively; the differential threshold is set to the average (950) of the lower and higher values.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The claims can encompass embodiments in hardware, software, or a combination thereof.

What is claimed is:

1. A method for generating an infrared mark indicator comprising:
    rendering image data to a CMYK image;
    transforming a black plane of the image data to a frequency domain;
    alternating frequency components of the black plane according to preselected watermarking messages to be embedded including security information;
    correcting color by adjusting CMY values;
    printing the image with the embedded security information;
    scanning the printed image with an infrared scanner;
    decoding the security information by transforming the black plane to frequency domain, whereby a machine-readable mark is recognized as the recovered watermarking information.

2. The method of claim 1 wherein the transforming of the black plane comprises imposing a transform function on a gray component replacement strategy for maximizing a usage of black toner in the rendering of the image data to enable the infrared mark.

3. The method of claim 1 wherein the transforming comprises selecting one of a Discrete Cosine Transform (DCT), a discrete Fourier Transform (OFT), or a Discrete Wavelet Transform (DWT) as the transform function.

4. The method of claim 1 wherein the printing includes embedding the transformed black plane in the rendered image data with a preselected method.

5. The method of claim 4 wherein the preselected method for embedding the transformed black plane is one of a Cox method or a two-level coding method.

6. A method for embedding security information in a printed image through frequency modulation of a rendered black plane of a CMYK image data, comprising:
    transforming frequency components of the black plane of image data representative of the printed image to a frequency domain corresponding to security information to be embedded as a mark;
    embedding the security information in the transformed black plane wherein CMV values are selected based on an encoded black value in order to maintain a same color appearance image for the printed image under a normal visual light illuminant;
    printing the image with the embedded security information;
    scanning the printed image with an infrared scanner;
    decoding the security information by transforming the black plane to the frequency domain, whereby a machine-readable mark is recognized as the security information.

7. The method of claim 6 wherein the transforming comprises selecting one of a Discrete Cosine Transform (DCT), a discrete Fourier Transform (DFT), or a Discrete Wavelet Transform (DWT) as the transform function.

8. The method of claim 6 wherein the printing includes embedding the transformed black plane in the rendered image data with a preselected method.

9. The method of claim 8 wherein the preselected method for embedding the transformed black plane is one of a Cox method or a two-level coding method.

10. A print image having an embedded watermark representative of security information comprising:
    a print image comprised of different color combinations having similar color appearance with different infrared reflectances wherein black plane image data is transformed to a frequency domain and selected frequencies correspond respectively to color combinations arranged to form an infrared detectable, embedded watermark.

11. The image of claim 10 wherein the black plane image data is transformed with one of a Discrete Cosine Transform (DCT), a discrete Fourier Transform (DFT), or a Discrete Wavelet Transform (DWT) as the transform function.

12. The image of claim 11 wherein the watermark is embedded with one of a Cox method or a two-level coding method.

* * * * *